(12) United States Patent
Li et al.

(10) Patent No.: US 6,784,397 B2
(45) Date of Patent: Aug. 31, 2004

(54) MOLD RELEASE AND ANTI-BLOCKING COATING FOR POWDER-FREE NATURAL OF SYNTHETIC RUBBER ARTICLES

(75) Inventors: Zhixin Li, Bridgewater, NJ (US); Joseph B. Gardner, Somerville, NJ (US); Chaodong Xiao, East Hanover, NJ (US); John S. Thomaides, Berkeley Heights, NJ (US); Yasuo Tokimori, Mino (JP); Stanislaw Petrash, Whippany, NJ (US); Christopher G. Gore, Cartersville, GA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 86 days.

(21) Appl. No.: 09/882,222

(22) Filed: Jun. 15, 2001

(65) Prior Publication Data

US 2002/0155310 A1 Oct. 24, 2002

Related U.S. Application Data

(63) Continuation-in-part of application No. 09/790,093, filed on Feb. 21, 2001, now abandoned.

(51) Int. Cl.$^7$ .......................... B23K 11/24; B28B 7/36; B29D 22/00
(52) U.S. Cl. ............... 219/115; 425/89; 106/38.35; 428/515
(58) Field of Search ................ 249/112, 114.1, 249/115; 425/89, 176, 183, 501, 502; 106/38.32, 38.35; 428/36.8, 407, 500, 515, 461, 35.2, 35.7, 200, 202, 203, 204, 206, 519, 520, 521, 522, 523; 523/205, 207, 333, 334; 524/475; 525/529, 533; 442/398; 264/212, 300, 306, 307; 317/160; 2/161.7, 168

(56) References Cited

U.S. PATENT DOCUMENTS

| | | | | |
|---|---|---|---|---|
| 4,492,783 A | * | 1/1985 | Tanaka et al. | 525/60 |
| 4,534,928 A | * | 8/1985 | Martin | 106/38.22 |
| 4,581,429 A | * | 4/1986 | Solomon et al. | 526/220 |
| 5,069,965 A | * | 12/1991 | Esemplare | 264/300 |
| 5,135,297 A | * | 8/1992 | Valint, Jr. | 351/166 |
| 5,204,126 A | * | 4/1993 | Singh et al. | 249/115 |
| 5,458,929 A | * | 10/1995 | Earls et al. | 525/533 |
| 5,691,069 A | * | 11/1997 | Lee | 2/161.7 |
| 5,900,452 A | * | 5/1999 | Plamthottam | 264/212 |
| 5,993,923 A | * | 11/1999 | Lee | 2/161.7 |
| 6,107,383 A | * | 8/2000 | Sharma | 523/205 |
| 6,355,343 B1 | * | 3/2002 | Glassock | 425/69 |
| 6,380,315 B1 | * | 4/2002 | Fischer et al. | 525/256 |
| 6,429,158 B1 | * | 8/2002 | Weberg et al. | 422/398 |
| 6,593,404 B1 | * | 7/2003 | Shin et al. | 525/71 |
| 6,730,380 B2 | * | 5/2004 | Littleton et al. | 428/36.8 |

FOREIGN PATENT DOCUMENTS

| | | | | |
|---|---|---|---|---|
| EP | 0 912 133 | * | 6/1999 | |
| EP | 1 044 616 A2 | | 10/2000 | A41D/19/015 |
| EP | 1 086 980 A | | 3/2001 | C08J/7/04 |
| WO | WO 96 25279 A | | 8/1996 | B29C/41/00 |
| WO | WO 02/22721 A2 | | 3/2002 | C08J/7/00 |

* cited by examiner

Primary Examiner—Stevan A. Resan
Assistant Examiner—Louis Falasco
(74) Attorney, Agent, or Firm—Thomas P. Roland

(57) ABSTRACT

The present invention is directed to a release composition for molds and formers used in the production of natural and synthetic latex articles. The release coating contains a waterborne, high Tg polymer formed from at least one hydrophobic monomer and at least one hydrophilic monomer, where the Tg of the polymer is at least −10° C. One advantage of the release composition is that it is compatible with a coagulant solution used in the formation of latex gloves. Articles formed using the release coating have good anti-blocking properties.

2 Claims, No Drawings

MOLD RELEASE AND ANTI-BLOCKING COATING FOR POWDER-FREE NATURAL OF SYNTHETIC RUBBER ARTICLES

This application is a continuation-in-part of application Ser. No. 09/790,093 filed Feb. 21, 2001 now abandoned.

The present invention relates to the use of a polymeric release composition for molds and formers used in the production of natural and synthetic rubber articles. In particular the polymeric release composition is useful for the formation of latex gloves, and also for preventing blocking on the outer surface of such gloves. The release composition of the present invention has the advantage of being easily cleaned from molds and formers, and is compatible with coagulant currently used in many manufacturing processes, eliminating the need for an extra step to coat the mold or former with a release coating.

BACKGROUND OF THE INVENTION

As used herein, the terms latex glove or latex article refer to a glove or article made of natural or synthetic rubber. Articles made from natural or synthetic rubber are elastic materials having low glass transition temperatures. The surfaces of these materials are tacky and tend to adhere to each other. For example, latex gloves are difficult to strip from glove formers at the end of the manufacturing process, and they tend to stick together, or block, when packaged for distribution and sale.

There are currently several approaches to solving the problem. One method involves the use of a particulate or powder material, such as starch, talc, or calcium carbonate. The particulate can be blended into a coagulant solution to form a barrier between the latex rubber and the surface of the former. The powder facilitates the stripping of gloves from the formers, and also prevents blocking. Unfortunately, the powder coating is a known nuisance, as loose powder can become airborne. Starch powder tends to adsorb proteins found in natural rubber latex and the powder is easily dislodged during use, contaminating the surrounding environment and causing allergies and other negative effects. Further, the protein/powder complex serves as a food source for bacteria, allowing them to proliferate. Recently, there has been a growing demand for powder-free natural and synthetic rubber gloves, which do not use loose powder.

Another approach is the use of a chlorination process to provide the necessary anti-blocking properties, as described in U.S. Pat. No. 4,851,266. In this case, calcium carbonate is used as a mold release agent and washed away prior to chlorination. Although this reduces the tack and friction of the rubber, this process makes the rubber less pliant and reduces the shelf life of the rubber article. Also, chlorination leaves the article quite slippery, which makes it difficult to handle objects with chlorinated gloves. To address this problem, chlorinated gloves are often textured.

Yet another approach is the use of silicone materials. These materials facilitate removal of gloves from the formers, and also reduce blocking. Unfortunately, the residue of this material is rather hard to clean from the former in preparation for the next dipping cycle.

Talc-free mold release agents using surfactants are described in U.S. Pat. No. 4,310,928.

Polymeric mold release agents have also been disclosed in the art. Formulated polychloroprenes are described in EP 0 640623, Urethane dispersions in U.S. Pat. No. 5,534,350, and Styrene/acrylates containing silicone in U.S. Pat. Nos. 5,993,923; 5,691,069; 5,700,585; and 5,712,346. Copending U.S. patent application Ser. No. 09/400,488, and copending U.S. Patent Application, submitted Sep. 15, 2000 describe the use of star polymers as inner coatings for latex gloves.

Surprisingly it has been found that a release composition containing a water-borne high Tg polymer formed from at least one hydrophobic monomer and at least one hydrophilic monomer provides a powder-free mold release agent, provides anti-blocking in the finished article, and also aids in providing a smooth latex deposition on the formers. Additionally, the release composition is dispersible in high electrolyte coagulant, making it compatible with current manufacturing processes.

SUMMARY OF THE INVENTION

The present invention is directed to a mold or former for natural or synthetic rubber articles having on its surface a release composition comprising a water-borne polymer formed from at least one hydrophobic monomer and at least one hydrophilic monomer, where the polymer has a Tg of at least $-10°$ C.

Other embodiments of the invention are methods of making a latex glove in which a release composition, containing a water-borne polymer, having a Tg of at least $-10°$ C., and formed from at least one hydrophobic monomer and at least one hydrophilic monomer, is applied to a former as a release coating.

Still another embodiment of the invention is a natural or synthetic rubber article having on its surface a coating comprising a polymer having a Tg of at least $-10°$ C., and formed from a hydrophobic monomer and a hydrophilic monomer.

Still another embodiment of the invention is a latex coagulant, comprising a release composition, comprising a polymer having a Tg of at least $-10°$ C., and formed from a hydrophobic monomer and a hydrophilic monomer, which is used in manufacturing powder-free rubber articles.

While not wishing to be bound to any particular theory, it is believed that the key performance characteristics desirable for a release coating are: a high Tg polymer, which provides anti-blocking; ease of cleaning from a former; wettability of the film, for smooth latex deposition; an affinity to the latex surface; the ability to impart an anti-blocking character to the article formed from a mold or former.

DETAILED DESCRIPTION OF THE INVENTION

The present invention is directed to a mold or former for the production of natural and synthetic rubber articles, having on its surface a release composition comprising a water-borne high Tg polymer formed from at least one hydrophobic monomer and at least one hydrophilic monomer.

Natural and synthetic rubber articles, as used herein, refer to articles made from low-Tg, tacky polymeric materials. Examples of such materials include, but are not limited to, butyl rubber, natural latex rubber, polyvinyl chloride, neoprene, nitrile, viton, styrene butadiene copolymers, polyurethanes, or interpenetrating polymer network emulsion polymers, or combinations of these.

The water-borne polymer of the present invention is one which is water-borne, and formed by means known in the art, such as emulsion polymerization and suspension polymerization.

By high Tg polymer is meant a polymer having a Tg of at least $-10°$ C., preferably from 25 to 200° C., and most preferably from 40 to 150° C. Monomers useful in forming the polymer of the present invention are ethylenically unsaturated monomers or mixtures thereof. Particularly useful hydrophobic monomers include (meth)acrylates, vinyl acetate, ethylene, and styrene. A preferred hydrophobic monomer is styrene.

The polymer of the present invention is also formed from a hydrophilic monomer. The hydrophilic monomer is present in the polymer at from 10–90 percent, based on the weight of the polymer. Suitable hydrophilic monomers include those monomers that are ionic, e.g. anionic, cationic, or zwitterionic, or have sufficient nonionic polar functionality, e.g. hydroxyl or amido groups to render them hydrophilic. Examples of such monomer include, but are not limited to hydroxyethyl acrylate, acrylonitrile, 2-(dimethylamino)ethyl (meth)acrylate, [3-(methacryloylamino)propyl]trimethylammonium chloride, 2-acrylamido-2-methyl-1-propanesulfonic acid sodium salt (a.k.a. AMPS), [2-(acryloyloxy)ethyl]trimethylammonium chloride. Preferred hydrophilic monomers are acrylic acid and methacrylic acid.

The polymer may optionally contain a cross-linker. The cross-linker is present at from 0 to 10 percent, and preferably from 0.5 to 5 percent by weight, based on the weight of the polymer. The cross-linker is preferably a di-functional cross-linker, such as divinylbenzene, diallyl maleate, ethylene glycol dimethacrylate, vinyl crotonate and diallyl phthalate. Multi-functional cross-linkers, such as allyl and vinyl sucrose ethers, pentaerythritol tetra(meth)acrylate, trimethylolpropane tri(meth)acrylate, and the like, can also be used.

The emulsion polymer of the present invention has an average particle size as measured by photon correlation spectroscopy in the range of from 0.05 to 1.5 microns, preferably from 0.15 to 0.9 microns, and most preferably from 0.2 to 0.6 microns. The particle size may be adjusted by means known in the art such as polymer seeding, initiator concentration, control of the salinity, water-hardness, surfactant concentration, type of surfactant, and by temperature effects on the surfactant solubility and initiator decomposition rate. It has been found that the particle size of the emulsion polymer is critical for proper anti-blocking properties. The particle size is also important to coagulant resistance. Particles that are too small have a poor resistance to a coagulant, while particles that are too large can settle in a dilute coagulant solution.

The release composition may optionally contain other ingredients, such as dispersants, surfactants, microspheres, and rheology modifiers.

Surfactants useful in the present invention include, but are not limited to: anionic, cationic, nonionic, and amphoteric surfactants; and polymeric surfactants including but not limited to linear and star copolymers. The surfactant improves the uniformity of the latex deposition, improves the ease of stripping and improves the wettability of the coated former by the latex.

Preferably the release coating contains no silicones, however the addition of a silicone to the composition can also be advantageous. A problem with having silicon compounds in the release composition is that they can remain on a mold or former, making the mold or former more difficult to clean.

The release composition may also contain microspheres. Microspheres are useful in reducing the surface contact area, and thus the adhesion between the coated rubber article and the mold, former, or other object. This improves both the release and anti-blocking characteristics. The microspheres have diameters below 60 microns, preferably from 5 to 40 microns, and most preferably from 10 to 30 microns. The microsphere may be made of any material that is harder than the article being coated. Examples of microspheres useful in the present invention are those made of polyamides such as nylons, polymethylmethacrylate, polystyrene, polyethylene, polypropylene, polytetrafluoroethylene, polyesters, polyethers, polysulfones, polycarbonates, polyether ether ketones, and other polymers and copolymers, silica, and microcrystalline cellulose. Preferably the microspheres are present in the release composition at from 0.05 to 5 percent by weight, and most preferably at from 0.1 to 1 percent by weight.

A dispersant may optionally be added to aid in dispersion of the microspheres into the aqueous release composition. Dispersants useful in the present invention include, but are not limited to, surfactants and polymeric dispersants including amphiphilic linear and star copolymers.

A rheology modifier is optionally present in the release composition. The rheology modifier is used to control the viscosity of the composition for ease of use in different manufacturing processes and equipment, and to control the uniformity and thickness of the coating. Rheology modifiers useful in the present invention include, but are not limited to cellulosics such as hydroxyethylcellulose, cationic hydroxyethylcellulose, such as polyquaternium-4 and polyquaternium-10, hydrophobically modified hydroxyethylcellulose, carboxymethylcellulose, methylcellulose, and hydroxypropylcellulose; dispersed or soluble starches or modified starches; and polysaccharide gums such as xanthan gum, guar gum, cationic guar gum such as guar hydroxypropyltrimonium chloride, and locust bean gum. Other suitable rheology modifiers include but are not limited to acid soluble copolymers, surfactants, etc. The rheology modifier is typically added at from 0.01 to 10 percent by weight, and preferably from 0.02 to 3 percent by weight, based on the release composition.

The release composition may also contain other additives known in the art, such as adhesion promoters, crosslinking agents, biocides, low surface energy compounds, fillers, and anti-foaming agents.

The release composition of the present invention is made by combining each of the ingredients to form an aqueous dispersion, by means known in the art.

The polymeric release coating may be used to coat a variety of materials used as molds and formers of natural and synthetic rubber articles. The molds and formers may be of any material known in the art, including but not limited to ceramics, glass, and stainless steel. Items produced in the molds or formers include gloves, prophylactics, catheters, tires, swimming caps, balloons, tubing, and sheeting. A particularly suitable end use application is as a release composition in the production of latex gloves, including surgeons' gloves, physicians' examining gloves, and workers' gloves, more particularly powder-free latex gloves.

When used to coat the molds or formers in the preparation of gloves, the polymeric coating composition may be applied using several different methods. For example, in one method for coating the glove mold or former, a former or mold in the shape of a hand is dipped into a solution or dispersion containing the release composition, then dipped into a coagulant mixture containing a latex coagulant. Useful coagulants include, but are not limited to, calcium nitrate and calcium chloride. In another method, a clean former or mold in the shape of a hand is dipped into a coagulant containing a release composition. After drying, the mold coated with the release coating and coagulant can be used to prepare a glove by methods known in the art. For example, the coated mold is immersed in a natural or synthetic rubber latex for a time sufficient for the rubber to coagulate and form a rubber coating of the desired thickness. Optionally, the glove then may be water leached to remove impurities from the rubber. The formed glove is then oven cured, cooled, and dipped into a coating composition, which will become the inner glove coating. Alternatively, the formed glove can be dipped into a coating composition prior to the oven cure and cooling. The inner surface treatments include, but are not limited to those known in the art, including polymers such as that described in U.S. patent application Ser. No. 09/663,468 incorporated herein by reference, other polymer coatings, chlorination, and starch or clay powders. After cooling, the glove is simultaneously stripped from the mold and inverted. Some, or all of the release coating on the glove mold or former is transferred to the what has become the outer surface of the glove.

The release composition and the coagulant can be combined into the same solution or dispersion. The release composition of the present invention is compatible with coagulants currently used in the production of rubber articles. The combination of the coagulant and release composition into the same processing step, allows manufacturers to use the release composition in current processes without the need for costly modifications or the need for additional processing steps.

In addition to being useful as an outside coating on a glove, the polymer composition of the present invention is useful as a release agent in other industries, including but not limited to: injection molding, C-V joints, and in the manufacture of tires, synthetic gloves, and other rubber articles.

Articles formed using the release composition of the present invention possess good anti-blocking properties. This property prevents adhesion between articles, such as latex gloves, which are packed together, but must be easily separated from each other for use.

The following examples are presented to further illustrate and explain the present invention and should not be taken as limiting in any regard.

Method A—Making a Latex Glove with a Pre-treated Former

A latex glove can be made by:
(a) Immersing a glove former in a solution or dispersion comprising a release composition comprising a waterborne polymer with Tg higher than −10° C. formed from at least one hydrophobic monomer, and at least one hydrophilic monomer, producing a coated former;
(b) after drying, immersing the coated former into a conventional coagulant solution;
(c) immersing said coated mold into a natural rubber latex to coat the former with said latex;
(d) optionally, leaching the latex coated former in water to remove impurities from the rubber;
(e) immersing the latex coated former into a inner surface coating composition;
(f) curing the latex in an oven; and
(g) removing the finished glove from the former.

Method B—Making a Latex Glove with a Formulated Coagulant

A latex glove can be made by:
(a) immersing a glove former in a coagulant solution containing a release composition comprising a waterborne polymer with Tg higher than −10° C. formed from at least one hydrophobic monomer, and at least one hydrophilic monomer, producing a coated former;
(b) immersing said coated mold into a natural rubber latex to coat the former with said latex;
(c) optionally, leaching the latex coated former in water to remove impurities from the rubber;
(d) immersing the latex coated former into a inner surface coating composition;
(e) curing the latex in an oven; and
(f) removing the finished glove from the former.

EXAMPLE 1

Preparation of an Emulsion Polymer

A resin kettle equipped with a mechanical stirrer, nitrogen inlet, thermometer, and two slow addition feeds was charged with water (391 g), TOMADOL 1-3 (13.8 g), and LUBRHOPHOS LB-400 (8.6 g). This stirred mixture was warmed to 65° C. while flushing with nitrogen. To this mixture was added 5% of a well mixed pre-emulsion prepared from the slow addition of premixed styrene (83.5 g), methacrylic acid (MM) (177.5 g), and ethylene glycol dimethacrylate (2.4 g) to a stirred premixed solution of LUBRHOPHOS LB-400 (8.6 g), TOMADOL 1-3 (13.8 g), and water (216 g). After this addition was complete, the reaction vessel was charged with an initial catalyst of sodium persulfate (0.2 g in 16.8 g water) and the reaction mixture was allowed to warm to 80° C. over the next 30 minutes. Once the reaction temperature of 80° C. was obtained, the reaction mixture was simultaneously charged with the pre-emulsion over 180 minutes and a sodium persulfate solution (0.27 g in 60 g water) over 210 minutes. Immediately after the addition of the catalyst was complete, the remaining monomer was scavenged by the addition of tert-butyl hydroperoxide (1.2 g in 2 g water), followed by the addition of ferrous ammonium sulfate (0.3 g of a 2% solution dissolved in 5 g water) 30 minutes later, then the slow addition of erythorbic acid (1.2 g in 10 g water) over the next 30 minutes. The reaction mixture was then cooled, filtered through an 80 mesh filter, and used for the formulation without additional purification.

The emulsion product contains 30% solids with 68 parts MAA, 32 parts styrene and 1 part cross-linker. The Tg of the polymer was estimated to be 115° C. using MSI simulation software.

EXAMPLE 2

Preparation of Polymer Containing Coagulant 500 g of polymer solution from example 1 was added to a 2-gallon container. 4500 g of coagulant solution (containing 10% calcium nitrate or 5% calcium chloride) were then slowly introduced while stirring. The polymer was stable in the coagulant dispersion, but mild flocculation was observed. Slight sedimentation was found over time but this can be easily redispersed. The polymer containing coagulant can last several weeks without changing the properties.

EXAMPLE 3

Making a Powder Free Glove Using Method B

A clean ceramic mold was rinsed and dried at 70° C. It was then immediately immersed for 10–20 seconds into the polymer containing coagulant from Example 2. The coated mold was then partially dried and immersed into natural rubber latex at room temperature for 20–30 seconds. After a brief cure (120° C. for 2 minutes), the latex deposit was leached in water at 60° C. to remove impurities from the natural rubber. The leached latex deposit was then dried and dipped into a polymeric inner surface treatment solution to coat the inner surface. The polymer treated glove was then vulcanized at 90–130° C. for 15–30 minutes.

The latex glove was easily stripped from the mold. The 2-side polymer treated latex glove was powder free, with the inside surface exhibiting good donnability and the outside surface exhibiting anti-blocking and non-slippery grip.

The mold was then immersed into a 1 molar KOH alkaline solution and rinsed with water to remove residual polymer. The cleaned mold was used for new latex depositions.

EXAMPLE 4

Making a Powder Free Glove Using Method A

A clean ceramic mold was rinsed and dried at 70° C. It was then immediately immersed for 10–20 seconds into a 3% solids dispersion of the polymer from example 1 in water. The mold was then dried at 70° C. for 1–4 minutes and immersed for 10–20 seconds into a regular coagulant (10% calcium nitrate aqueous solution or 5% calcium chloride). The coated mold was then partially dried and immersed into natural rubber latex at room temperature for 20–30 seconds. After a brief cure (120° C. for 2 minutes), the latex deposit was leached in water at 60° C. to remove impurities from the natural rubber. The leached latex deposit was then dried and dipped into a polymeric inner surface treatment solution to coat the inner surface. The polymer treated glove was then vulcanized at 90–130° C. for 15–30 minutes.

The latex glove was easily stripped from the mold. The 2-sided polymer treated latex glove is powder free, with the inside surface exhibiting good donnability and the outside surface exhibiting anti-blocking and non-slippery grip.

The mold was cleaned by immersing into a 1 molar KOH alkaline solution and rinsing with water to remove remaining polymer. The clean mold was used for new latex depositions, with no degradation in glove quality.

EXAMPLE 5

Making Powder Free Latex Gloves with Emulsion Polymers with Different Tg's

Emulsion polymers were made as in example 1 with different Tg's by varying the monomer compositions. All polymers contained 1 part per hundred monomer (pphm) of a difunctional cross-linker.

TABLE 1

|  | MAA | Styrene | Butyl Acrylate | Estimated* Tg |
|---|---|---|---|---|
| Sample 5A | 68% | 32% |  | 115° C. |
| Sample 5B | 35% | 40% | 25% | 74° C. |
| Sample 5C | 35% | 25% | 40% | 53° C. |

*All Tg were estimated using MSI simulation software.

These polymers were used as release agents in the preparation of powder free latex gloves, using Method B at 3% polymer concentration. For all polymers, the latex deposits were uniform and the stripped molds were easy to clean. The anti-blocking of polymer 5A was very good, polymer 5B was good, and polymer 5C was fair.

EXAMPLE 6

Making Powder Free Latex Gloves with Emulsion Polymers of Different Cross-linking Density Emulsion polymers were made as in example 1 with different cross-linker (ethylene glycol dimethacrylate) amounts. The cross-linker, parts per hundred monomer (pphm), varied from 0 pphm, 0.5 pphm, 1 pphm, 2 pphm, 3 pphm, 4 pphm to 5 pphm. Gelling was noted at 5 pphm cross-linker. These polymers, with the exception of the one containing 5 pphm cross-linker, were used as release agents in the preparation of powder free latex gloves, using Method B at 3% polymer concentration. All polymers produced uniform latex deposition and the stripped molds were easy to clean. Zero pphm cross-linker showed reduced mold release and anti-blocking. All other polymers showed very good anti-blocking and mold release. Four pphm cross-linker showed exceptional ease of stripping.

EXAMPLE 7

Making Powder Free Latex Gloves with Emulsion Polymers of Different Acid Level

Emulsion polymers were made as in example 1 with different acid levels. All polymers contained 1 pphm ethylene glycol dimethacrylate cross-linker.

TABLE 2

|  | MAA, % | Styrene, % |
|---|---|---|
| Sample 7A | 0 | 100 |
| Sample 7B | 5 | 95 |
| Sample 7C | 20 | 80 |
| Sample 7D | 25 | 75 |
| Sample 7E | 35 | 65 |
| Sample 7F | 38 | 62 |
| Sample 7G | 48 | 52 |
| Sample 7H | 50 | 50 |
| Sample 7I | 68 | 32 |
| Sample 7J | 74 | 26 |
| Sample 7K | 80 | 20 |

The 80% MAA reaction gelled. These polymers, with the exception of the one containing 80% MAA, were used as release agents in the preparation of powder free latex gloves, using Method B at 3% polymer concentration. Zero and 5% MAA showed good anti-blocking and mold release. All others showed very good anti-blocking and mold release. Polymer 7D exhibited long time stability in the coagulant mixture.

EXAMPLE 8

Making Powder Free Latex Gloves with Emulsion Polymers Containing Methyl Methacrylate (MMA)

Polymer emulsions were prepared according to example 1 using methyl methacrylate (MMA) in place of styrene. All polymers contained 1 pphm ethylene glycol dimethacrylate cross-linker.

TABLE 3

|  | MMA | MAA |
|---|---|---|
| Sample 8A | 32% | 68% |
| Sample 8B | 50% | 50% |
| Sample 8C | 75% | 25% |

These polymers were used as release agents in the preparation of powder free latex gloves, using Method B at 3% polymer concentration. The results showed that the higher the percent of methyl methacrylate, the better the mold release and anti-blocking. All gave acceptable mold release and anti-blocking properties.

EXAMPLE 9

Making Powder Free Latex Gloves with Emulsion Polymers Containing other Hydrophobic Monomers Polymer emulsions were prepared according to example 1 using other hydrophobic monomers in place of styrene (table 4).

TABLE 4

|           | Hydrophobic Monomer | MAA |
|-----------|---------------------|-----|
| Sample 9A | CHM 32%             | 68% |
| Sample 9B | IBXM 75%            | 25% |
| Sample 9C | DPA 75%             | 25% |

Monomers for polymers 9A-C include cyclohexyl methacrylate (CHM), isobornyl methacrylate (IBXM), and dicyclopentanyl acrylate (DPA). All polymers contained 1 pphm of a difunctional cross-linker. These polymers were used as release agents in the preparation of powder free latex gloves, using Method B at 3% polymer concentration. All samples gave acceptable anti-blocking and mold release.

EXAMPLE 10

Making Powder Free Latex Gloves with Surfactants

A series of non-ionic surfactants, including BRIJ and TWEEN from ICI, and SURFYNOL from Air Products, were used as release agents in the preparation of powder free latex gloves, using Method B. The concentration of the surfactants was 2% in the release coatings. The latex deposit was uniform and the stripped formers were very easy to clean. The latex glove was easily stripped off the mold, but exhibited poor anti-blocking.

EXAMPLE 11

Making a Powder Free Latex Glove with Beads

Poly(methyl methacrylate) (PMMA) beads with particle size around 20 $\mu$m were dispersed in a regular coagulant solution (containing 10% calcium nitrate or 5% calcium chloride). The weight percentage of beads was 3% in the total solution. This dispersion was used as a release agent in the preparation of powder free latex gloves, using Method B. The latex glove was hard to strip off the former.

EXAMPLE 12

Making Powder Free Latex Gloves with a Thickener

Xanthan gum was dissolved in a regular coagulant solution, containing 10% calcium nitrate or 5% calcium chloride. The concentration of xanthan gum in the formulated coagulant was 0.04%. This dispersion was used as a release agent in the preparation of powder free latex gloves, using Method B. The latex gloves were hard to strip off the formers and showed poor anti-blocking.

EXAMPLE 13

Making Powder Free Latex Gloves with a Polymer and a Thickener

A formulated coagulant containing 0.04% xanthan gum and 3% polymer from example 1 was prepared. This dispersion was used as a release agent in the preparation of powder free latex gloves, using Method B. The outside polymer coating was more uniform than in example 3.

EXAMPLE 14

Making Powder Free Latex Gloves with Beads, a Surfactant, and a Thickener

A formulated coagulant containing 0.3% Beads, 0.1% SURFYNOL-465 and 4% $CaCl_2$ was prepared. This dispersion was used as a release agent in the preparation of powder free latex gloves, using Method B. The outside coating was uniform, but the latex gloves were hard to strip off the formers and showed poor anti-blocking.

EXAMPLE 15

Making Powder Free Latex Gloves with a Polymer Formulation

A formulated coagulant containing, 4% calcium chloride, 2% polymer from example 1, 0.25% PMMA beads, and 0.1% SURFYNOL-465 surfactant was prepared. This dispersion was used as a release agent in the preparation of powder free latex gloves, using Method B. Compared to examples 3 & 4, the glove is more uniform, and easier to strip off the former. The glove also exhibited excellent anti-blocking.

EXAMPLE 16

Particle Size Measurement

The particle size of emulsion polymer from Example 1 was measured by photon correlation spectroscopy to be 0.24 $\mu$m, using a B190 particle size analyzer at 25° C.

EXAMPLE 17

Controlling Particle Size by Reaction Temperature

Emulsions were made according to Example 1, where all compositions and procedures were kept the same except the temperature for adding the surfactants was varied. Table 5 lists the emulsion particle sizes, measured using a B190 particle size analyzer, with respect to surfactant adding temperature.

TABLE 5

| sample | Surfactant adding temperature | Particle size |
|--------|-------------------------------|---------------|
| 17A    | 80° C.                        | 0.325 $\mu$m  |
| 17B    | 60° C.                        | 0.202 $\mu$m  |
| 17C    | 20° C.                        | 0.103 $\mu$m  |

EXAMPLE 18

Controlling Particle Size by Salinity

Emulsions were made according to Example 1, where the salinity of the water was controlled by adding certain parts of sodium chloride into deionized water. All other compositions and procedures were kept the same. Table 6 lists the emulsion particle sizes, measured with a B190 particle size analyzer, with respect to salt concentration in water.

TABLE 6

| sample | Salinity | Particle size |
|---|---|---|
| 18A | 100 ppm | 0.162 μm |
| 18B | 1000 ppm | 0.278 μm |
| 18C | 10,000 ppm | Reaction gelled |

EXAMPLE 19

Anti-Blocking Performance of Emulsion with Different Particle Size

The emulsion polymers from example 17, plus an emulsion polymer having a particle size of 0.58 microns, were used as release agents in the preparation of powder free latex gloves, using Method B at 3% polymer concentration. The anti-blocking of the gloves was very good for the gloves made with the emulsions having particle sizes of 0.58 microns and 0.325 microns, good for the gloves made with the emulsion having a particle size of 0.202 μm, and poor for the gloves made with the emulsion having a particle size of 0.103 μm.

The emulsion polymers from example 18 were used as release agents in the preparation of powder free latex gloves, using Method B at 3% polymer concentration. The anti-blocking of the gloves was very good for gloves made with the emulsion having a particle size of 0.278 μm and acceptable for gloves made with the emulsion having a particle size of 0.162 μm.

EXAMPLE 20

Coagulant Resistance of Emulsions with Different Particle Size 1 part of the emulsion polymers of Example 17 was mixed with 3 parts of 5% calcium chloride solution. The emulsion having a particle size of 0.103 μm gelled, the emulsion having a particle size of 0.202 μm did not gel and the mixture was stable for weeks, and the emulsion having a particle size of 0.325 μm did not gel and the mixture showed slight settling after 3 days.

What is claimed is:

1. A mold or former used to form natural or synthetic rubber articles by immersion of the mold or former into a natural or synthetic rubber latex, onto which former is first disposed a release composition to facilitate release of the rubber latex from the mold or former, the release composition comprising an emulsion polymer having a Tg of at least −10° C., the emulsion polymer formed from:
   (a) at least one hydrophobic monomer selected from the group consisting of acrylates, methacrylates, vinyl acetate, ethylene, and styrene; and
   (b) at least one hydrophic monomer selected from the group consisting of hydroxyethyl acetate, acrylonitrile, 2-(dimethylamino)ethyl(meth)acrylate, [3,(methacryboylamino)propyl]-trimethylammonium chloride, 2-acrylamido-2-methyl-1-propanesulfonic acid sodium salt, [2-(acryloyboxy)-ethyl]trimethyl-ammonium chloride, acrylic acid, and methacrylic acid.

2. The mold or former according to claim 1 in which the emulsion polymer is formed from styrene and methacrylic acid.

* * * * *